Figure 1:
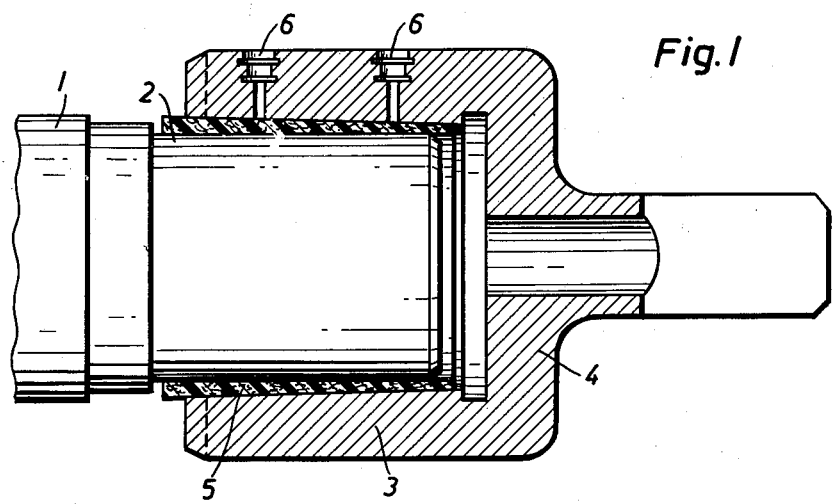

Nov. 26, 1963   KARL-HEINZ KATER   3,111,823
OVERLOAD PROTECTION MEANS BETWEEN CONNECTED ROTARY MEMBERS
Filed Oct. 6, 1961

INVENTOR
Karl-Heinz Kater
BY
Lowry + Rinehart
ATTYS.

3,111,823
OVERLOAD PROTECTION MEANS BETWEEN CONNECTED ROTARY MEMBERS
Karl-Heinz Kater, Leverkusen-Schlebusch, Germany, assignor to Theodor Wuppermann G.m.b.H., Leverkusen, Germany, a firm
Filed Oct. 6, 1961, Ser. No. 143,426
Claims priority, application Germany Oct. 11, 1960
3 Claims. (Cl. 64—28)

This invention relates to an overload protection means between two interconnected rotary members, in particular shafts, making use of a shrinkage connection between the members, and primarily in rolling-mill construction.

For example in rolling-mill drives, it is conventional to connect together the rotating members transmitting a torque, by shrinking them on each other, but such rolling-mill drives are subjected to extremely high shock loads, and this makes overloading unavoidable. The shrinkage connection is provided inter alia between the rolls or the roll journals and the so-called "wobblers," the wobblers being drawn onto the journals of the rolls or pinions. Use is preferably made of the cold-shrinking process wherein, in contradistinction to the hot-shrinking process, no temperature change takes place which is detrimental to the structure and surface. Between the members to be connected, a liquid generally oil (from which the term "oil-shrinkage" is derived) is introduced under high pressure, so as to cause the expansion of the member to be shrunk on, thus permitting the pushing one over the other of the members to be connected. When the pressure is decreased, the elasticity of the material eliminates the expansion and the member to be shrunk on is pressed on with a greater or lesser degree of tension, depending on the magnitude of the degree of shrinkage. As this is done, the liquid between the members is again pressed out to a greater or lesser extent, depending on the surface quality of the members. In order to facilitate axial displacement in the case of shrinkage connections which require to be released, use is frequently made of a conical seating between the said members. If this is done, the shrinkage-off process produces an axial component which, if the angle of inclination has been made sufficiently large, brings about the independent pushing-off of the outer member, without supplementary outer axial force. For constructional reasons, the inner member (journal) is preferably made cylindrical and provided with an externally-conical intermediate sleeve of metal upon which the outer member (sleeve) is then shrunk-on.

In order to take up the overloads encountered in rolling-mills, various methods have already been adopted. For example, the course has been adopted of fusing the electrical drives. An overload protection arrangement of this kind has, however, the disadvantage that the shock or impact passes first of all through the spindles, pinions, and gearing and may there do damage. For this reason, the weak point of the drive is often located in the atriculating spindles. This solution is extremely costly and sometimes results in an extremely high loss of production due to the changing of the spindles. It may also happen that the overload effects the shrinkage connection. This results is slipping between the journal and the coupling socket. The result of this is that in consequence of the considerable friction between the members connected by shrinkage, takes place between these members and it is subsequently found to be impossible to draw the members off. In such cases, it is necessary to saw off the roll journals and to drill out the sockets.

According to the invention, these disadvantages are obviated. The invention is characterized in that the weak point of the drive is located in the front connection between rotary members transmitting the torque, and in this way the above-described disadvantageous phenomena are eliminated. For this purpose, it is a provision of the invention that the coupling socket part to be shrunk on engages with an inner journal part of non-metallic material taking up the shrinkage effect. Preferably, an intermediate sleeve of non-metallic material is inserted between the journal and the socket. In this manner, the shrinkage connection simultaneously constitutes the overload protection means. The result is that, in the case of overload, the separation between the drive members takes part at that point which is in any case releasable for the purpose of changing the members. Also, in the case of overload, i.e., under the complete effect of the gripping force of the shrinkage connection, the journal and the coupling socket are displaced relatively to each other, without causing any damage to the connecting elements. The use of the non-metallic material for at least one of the opposite surfaces of the shrinkage connection furthermore obviates the danger of fretting corrosion. Furthermore, the further advantage is achieved of substantially lower prime costs for a non-metallic intermediate sleeve relatively to a metal sleeve.

In general, it suffices if a portion of the shrinkage connection part is formed from the non-metallic material. It is, however, also possible to use the non-metallic material on both connecting parts. Although, for the sake of simple construction, the journal is equipped with a non-metallic sleeve, it would also be quite possible, in special cases, to arrange the non-metallic material in the connecting surface on the socket part alone. Advantageously the non-metallic material is for example a synthetic plastic material.

The overload protection means according to the invention is adjustable and can be regulated, in that the parts of the shrinkage connection engage one within the other to a greater or lesser depth. A further possibility for regulation consists in that the non-metallic intermediate sleeve is made conical externally and/or internally. Also the degree of cone or double cone surface internally and externally on the intermediate sleeve can be used as an adjustable measure for the overload protection means.

Figure 2:
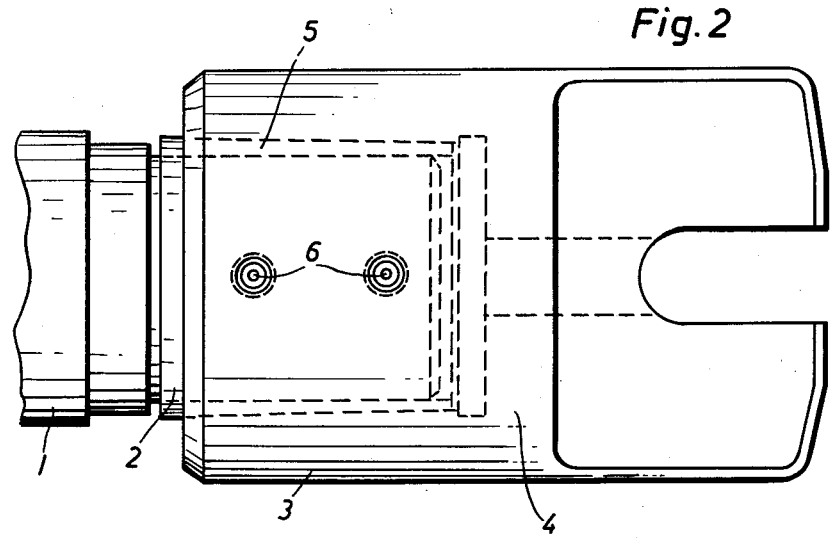

A constructional example according to the invention is illustrated in the drawings, wherein:

FIG. 1 shows an overload protection means according to the invention between two interconnected rolling-mill members, partly in longitudinal section, and FIG. 2 is a plan view of the arrangement of FIG. 1.

The rolling-mill members to be connected together consists of the roll 1 with the roll journal 2 and the coupling socket 3 of the connecting member 4, the so-called wobbler. Drawn onto the roll journal 2 is an intermediate sleeve 5 which, according to the invention, is made of a non-metallic material, preferably synthetic plastic material. The sleeve 5 is conical on its outer periphery. The wobbler 3—4 is shrunk on this sleeve, by means of oil-shrinkage, in known manner, oil being fed to the outer side of the sleeve through ports 6. As this is done, the desired overload moment can be adjusted, in that the wobble 3—4 is pushed to a greater or lesser extent onto the conical intermediate sleeve 6, shrinkage tensions being correspondingly set up. When the set breaking-loose moment in operation is exceeded by overload, the wobbler 3—4 slides over the intermediate sleeve 5 of non-metallic material, without binding. It has been found that wobblers which have slipped due to overload can subsequently be drawn off without difficulty.

The adjustable shrinkage connection according to the invention can be utilized in every case wherein it is necessary frequently to release the members to be connected together and wherein machine damage can be caused by overload. An advantageous field of application is encountered in the construction of rolls and pinion wobblers, and also in the case of upsetting disc mountings.

"Duroplast" with or without fabric inserts, are advantageously used for the intermediate sleeve 5. A hard fabric material is especially advantageous. Under certain circumstances, it is also possible to use a material of hard rubber, preferably of a synthetic nature, and which is oil-resistant and capable of resisting the shrinkage load.

What is claimed is:

1. In overload protection means between two rotating members, especially rolling mill drives, connected with one another by shrinkage the drives comprising axially aligned shaft members, a coupling socket on the end of one shaft member with the journaled end of the other shaft member seated therein, and an intermediate sleeve of non-metallic material interposed between the walls of the socket of one shaft and the journaled end of the other shaft and capable of resisting shrinkage load and being oil resistant.

2. Overload protection means as in claim 1 wherein the outer face of the intermediate sleeve and the inner face of the coupling socket have mating conical surfaces.

3. Overload protection means as in claim 2 wherein the intermediate sleeve is formed of "Duroplast" with fabric inserts.

References Cited in the file of this patent

UNITED STATES PATENTS

| | | |
|---|---|---|
| 1,550,936 | Veith | Aug. 25, 1925 |
| 1,948,834 | Volk | Feb. 27, 1934 |
| 2,032,900 | Alger | Mar. 3, 1936 |
| 2,564,605 | Martin | Aug. 14, 1951 |
| 2,705,113 | Bonanno | Mar. 29, 1955 |
| 2,720,691 | Kuniholn | Oct. 18, 1955 |
| 2,787,956 | Kirby et al. | Apr. 9, 1957 |